US010892132B2

(12) United States Patent
Albright et al.

(10) Patent No.: US 10,892,132 B2
(45) Date of Patent: Jan. 12, 2021

(54) SYSTEM AND METHOD FOR XENON RECOVERY

(71) Applicant: AIR PRODUCTS AND CHEMICALS, INC., Allentown, PA (US)

(72) Inventors: Christopher Michael Albright, Allentown, PA (US); Andrew David Johnson, Doylestown, PA (US); David Charles Winchester, Walnutport, PA (US)

(73) Assignee: Versum Materials US, LLC, Tempe, AZ (US)

( * ) Notice: Subject to any disclaimer, the term of this patent is extended or adjusted under 35 U.S.C. 154(b) by 1279 days.

(21) Appl. No.: 14/498,354

(22) Filed: Sep. 26, 2014

(65) Prior Publication Data

US 2015/0099416 A1 Apr. 9, 2015

Related U.S. Application Data

(60) Provisional application No. 61/886,383, filed on Oct. 3, 2013.

(51) Int. Cl.
*H01J 9/52* (2006.01)
*B02C 19/00* (2006.01)
*C01B 23/00* (2006.01)

(52) U.S. Cl.
CPC ............ *H01J 9/52* (2013.01); *B02C 19/0068* (2013.01); *C01B 23/0052* (2013.01); *C01B 2210/007* (2013.01); *C01B 2210/0037* (2013.01); *C01B 2210/0098* (2013.01); *Y02W 30/82* (2015.05)

(58) Field of Classification Search
CPC ........ B02C 19/0068; B02C 23/20; H01J 9/52; C01B 23/0052; Y02W 30/828; B01B 2210/0037; B01B 2210/007; B01B 2210/0098
USPC .................................................. 241/60, 99
See application file for complete search history.

(56) References Cited

U.S. PATENT DOCUMENTS

| | | | |
|---|---|---|---|
| 4,545,540 A | 10/1985 | Nakamura | |
| 4,858,833 A | 8/1989 | Hanulik | |
| 5,205,497 A | 4/1993 | Deklerow | |
| 5,492,278 A * | 2/1996 | Raboin | B02C 19/0068 241/152.2 |
| 5,586,730 A * | 12/1996 | Mortrud | B02C 19/0068 241/100 |
| 5,934,103 A * | 8/1999 | Ryan | A61K 49/1815 204/157.22 |
| 6,089,282 A * | 7/2000 | Spiegelman | B01D 53/00 137/256 |
| 6,641,066 B2 * | 11/2003 | Kamiya | B02C 13/18 241/100 |

(Continued)

FOREIGN PATENT DOCUMENTS

CN 1109203 9/1995
CN 1517162 A 10/2002
(Continued)

*Primary Examiner* — Shelley M Self
*Assistant Examiner* — Smith Oberto Bapthelus
(74) *Attorney, Agent, or Firm* — Anne B. Kiernan

(57) ABSTRACT

Xenon is contained within articles of manufacture such as light bulbs. Described herein are an apparatus, system, a method to capture and collect the xenon contained in articles of manufacture such as defective light bulbs for recovery and/or reuse.

13 Claims, 8 Drawing Sheets

(56) References Cited

U.S. PATENT DOCUMENTS

2009/0121054 A1* 5/2009 Gilliam .............. B02C 19/0068
  241/30
2012/0167765 A1 6/2012 Yuasa

FOREIGN PATENT DOCUMENTS

| CN | 2746981 Y | 12/2005 |
| CN | 1727066 A | 2/2006 |
| CN | 1902723 A | 1/2007 |
| CN | 102530895 A | 7/2012 |
| CN | 102693890 A | 9/2012 |
| CN | 202549774 U | 11/2012 |
| CN | 202666654 U | 1/2013 |
| CN | 202736879 U | 2/2013 |
| CN | 23082543 U | 7/2013 |
| EP | 1029595 | 8/2000 |
| JP | 07-033417 | 3/1995 |
| TW | 201134544 | 10/2011 |

\* cited by examiner

US 10,892,132 B2

SYSTEM AND METHOD FOR XENON RECOVERY

CROSS-REFERENCE TO RELATED APPLICATIONS

This application claims benefit of U.S. Provisional Application No. 61/886,383, filed Oct. 3, 2013. The disclosure of this provisional application is hereby incorporated by reference in its entirety.

BACKGROUND OF THE INVENTION

Described herein are an apparatus, system, and method for recovery of manufacturing materials from an article of manufacture, such as for example, xenon. Also described herein are systems and methods that recover and then reuse the manufacturing material. More specifically, described herein is an apparatus, system, and method for the recovery, and in certain embodiments, reuse, of xenon from an article of manufacture such as, without limitation, light bulb components comprising xenon.

Low voltage xenon light bulbs and line voltage xenon light bulbs are alternatives to incandescent light bulbs for virtually all applications and replacing incandescent light bulbs for many reasons. Low voltage xenon light bulbs and line voltage xenon light bulbs last up to 20,000 hours whereas incandescent light bulbs typically last 2,000 hours. Handling incandescent light bulbs with bare hands drastically reduces the life of the bulb. Further, incandescent light bulbs, low voltage xenon light bulbs and line voltage xenon light bulbs do not emit UV rays. This quality makes low voltage xenon light bulbs and line voltage xenon light bulbs ideal for use around sensitive fabrics and artworks.

During the manufacturing process for making xenon light bulbs, a certain percentage of these bulbs are defective such as the bulb is misshapen, the electrode will not ignite or other reasons. The defective light bulb is removed from the production line and sent to be scrapped. The defective xenon light bulb is then thrown into the glass melt furnace and the xenon contained therein goes out the furnace via the flue.

Accordingly, there is a need to provide a method, system, apparatus or combinations thereof for capturing the xenon in an article of manufacture, such as without limitation a light bulb, to be reused for production of other articles of manufacture such as new xenon light bulbs or reused for other production process besides xenon light bulbs.

BRIEF SUMMARY OF THE INVENTION

The method, system, and apparatus described herein fulfill at least one of the needs in the art. The method, system, and apparatus described herein recovers xenon gas from an article of manufacture, more specifically, light bulb components comprising xenon (Xe), nitrogen ($N_2$), optionally krypton (Kr) and other trace gases (e.g., phosphine, methyl bromide, etc.). The method, system, and apparatus separates the glass bulbs from the gas contained therein to be recycled, and in certain embodiments, reused in the manufacturing process.

In one aspect, there is provided an apparatus for capture and recovery of xenon gas from an article of manufacture comprising;
(a) a feed hopper to receive a feed comprising articles of manufacture having xenon gas contained therein and having a conduit to a pressure vessel;
(b) the pressure vessel having a lid with an opening to receive the feed, a bottom which is in communication with a collection vessel, and a crusher contained therein wherein the pressure vessel is in fluid communication with a vacuum pump wherein the crusher crushes the articles of manufacture to provide a crude gas mixture comprising Xe and a glass residue;
(c) the collection vessel to receive the glass residue from the pressure vessel;
(d) optionally a bulk dust collector in fluid communication with the pressure vessel to remove any residual dust that arises from the glass residue;
(e) a recovery line having a connection to the pressure vessel capable of removing the crude gas comprising xenon from the pressure vessel and sending it to a recovery vessel;
(f) an automatic valve in the recovery line having a signal connection to a process controller;
(g) a process controller; and,
(h) the recovery vessel which is capable of housing the crude xenon. In certain embodiments, the pressure vessel is housed in an enclosure which is optionally ventilated.

In another aspect, there is provided a system for the capture and recovery of xenon from an article of manufacture having xenon contained therein, comprising;
a pressure vessel capable of being sealed, comprising an input for receiving articles of manufacture having xenon contained therein, a crusher which takes the articles of manufacture and forms a glass residue, wherein the pressure vessel is provided with one or more lines in fluid communication with a vacuum pump, an optional bulk dust collector, and in electrical communication with a process controller;
a recovery line from the pressure vessel capable of removing crude xenon from the pressure vessel and sending it to a recovery vessel; and
a process controller.

DETAILED DESCRIPTION OF THE INVENTION

Figure 1:
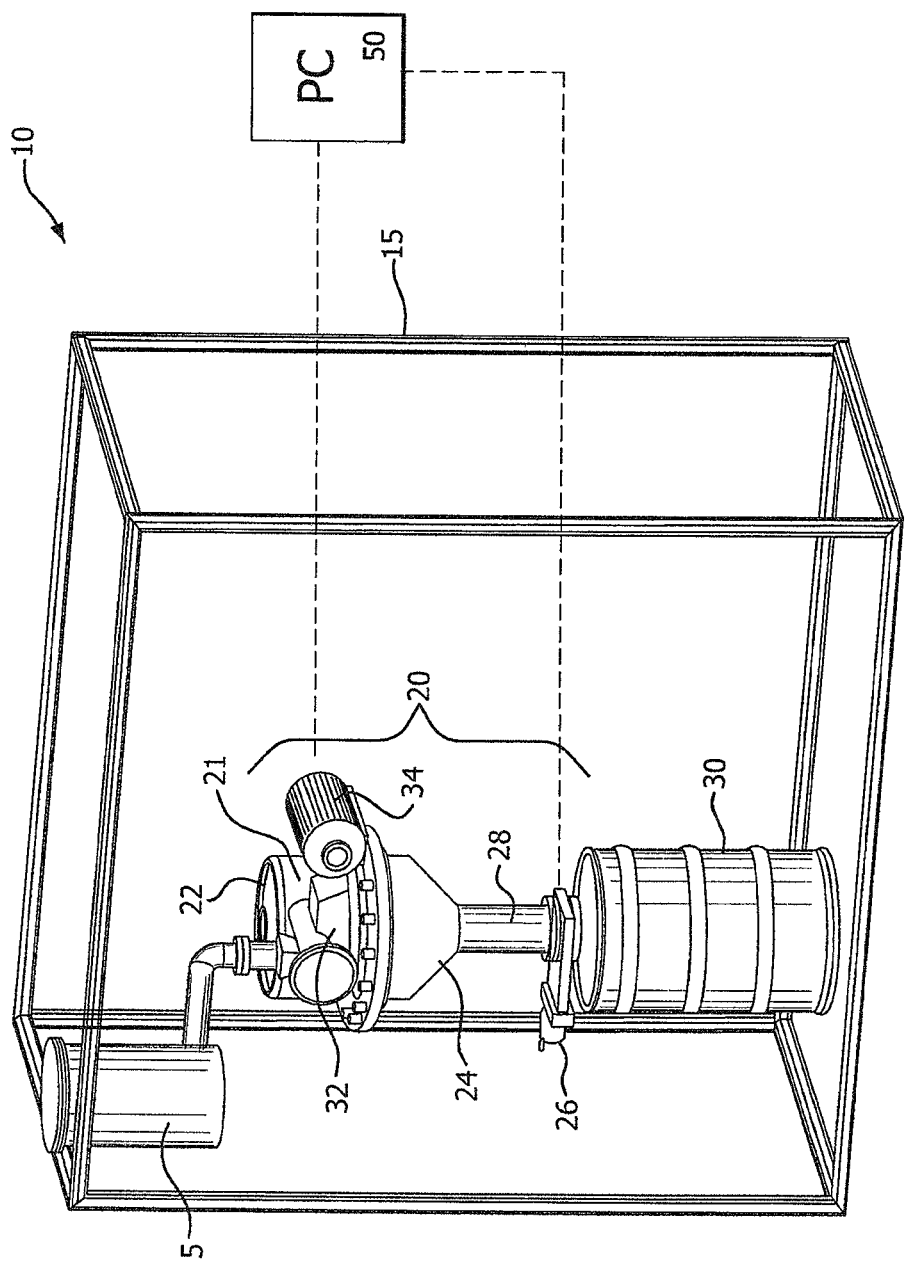
FIG. 1 provides an isometric view of an embodiment of an apparatus that can be used for recovering Xe from a glass light bulb and send the recovered Xe to a recovery vessel (not shown in the Figure).

Material recovery provides an opportunity to reduce the cost and amount of waste generated by the xenon light bulb manufacturing process. Defective, or out of specification, light bulb capsules, such as for example, light bulbs that will not light or have a cosmetic defect, contain a gas mixture comprising Xe, $N_2$, optionally Kr, and other components (e.g., phosphine, methyl bromide, silane, or other gases). In one particular embodiment, the article of manufacture comprises a glass light bulb having about 90% or greater by volume of Xe, 8% or less by volume of $N_2$, and the balance other components, such as without limitation phosphine, methyl bromide, silane, etc. wherein all of the volume percentages add up to 100%. Prior art methods simply discarded the defective xenon light bulb capsules in a glass melt furnace and the gaseous Xe contained therein escaped through the flue. The apparatus, method, and system contained therein recover the Xe for reuse for light bulb manufacturing or other uses rather than being treated as waste. Material recovery improves the utilization efficiency of, and reduces the amount of waste generated by, the manufacturing process. While the method, system and/or apparatus described herein is used for capturing and reusing Xe from a light bulb manufacturing process, it is believed that these methods, systems, and/or apparatus, can be extended to other manufacturing processes or other articles of manufacture having gaseous components contained therein.

Described herein is a means to recover desirable materials, such as but not limited to Xe, in yields that minimize production waste and allow, in certain embodiments, the desirable materials to be captured and stored for re-use in the manufacturing process. Xe in defective glass bulbs was previously disposed of as waste along with the glass bulb and all components associated therewith. The method, system, and system described herein allows for the production waste or Xe contained within a defective glass bulb to be captured into a storage vessel such as a cylinder and then reused for future production. In certain embodiments, the recovered Xe can be condensed to a fluid prior to storage. In these embodiments, the recovered Xe is captured in a condensed phase in a vessel. The Xe can subsequently be reused by heating the vessel and vaporizing the Xe. The term "fluid" as used herein means gaseous, liquid, supercritical fluid, vapor, and combinations thereof.

In one particular embodiment, the defective light bulb capsules weigh about 4.65 grams (gm) each and each bulb contains about 2 cubic centimeters (cc) of gas comprising Xe, $N_2$ and other materials at 5 atmospheres (atm). In this embodiment, if 100,000 defective bulbs are processed at a total weight of 1,025 pounds (lbs.), there is a potential to recover about 35.3 standard cubic feet (SCF) of gas. if the gas processing step takes four hours it results in a flow of 0.15 standard cubic feet per minute (SCFM). Exemplary yields obtainable for the Xe for reuse using the method described include one or more of the following endpoints: 50 vol % or greater, 55 vol % or greater, 60 volume or greater, 65 vol % or greater, 70 vol % or greater, 75 vol % or greater, 80 vol % or greater, or 90 vol % or greater based on the gross material supply of Xe contained in the feed stock of glass light bulb capsules. Also described herein is an apparatus and system that efficiently captures the crude Xe mixture from the article of manufacture, optionally removes impurities from the crude Xe mixture, optionally removes nitrogen from the crude Xe mixture, and optionally recycles the recovered Xe or other desirable process gas back to the production process.

FIG. 1 provides one embodiment of the apparatus described herein. As FIG. 1 illustrates, apparatus 10 comprises a pressure vessel 20 that has a lid 22, bottom 24, and a gate valve 26. Certain components of apparatus 10 such as the gate valve 26 and crusher 32/motor 34 are in electrical communication with a process controller 50. Process control 50 can be a central processing unit, wireless signal receiver or other means that can direct, receive, or both electrical signals from one or more components within apparatus 50 to activate or deactivate one or more components within apparatus 10. Process control 50 can also be used, for example, to monitor certain aspects of apparatus 10 such as pressure, toxicity, percentage of Xe or other parameters. Apparatus 10 is housed in an enclosure 15 which is optionally ventilated (ventilation system not shown). Pressure vessel 20 is capable of pressures ranging from full vacuum to 15 PSIG and is in fluid communication with a pump (not shown in FIG. 1). Lid 22 on top of pressure vessel 20 is to allow defective light bulb capsules to be loaded into chamber 21 of the pressure vessel 20 from feed hopper 5. The valve 26 on the bottom 24 is to allow for crushed glass or glass residue and waste metal to be removed from the vessel 20 via a conduit 28 into collection drum 30. Once light bulb capsules are loaded into the chamber 21 of vessel 20, all access points to the pressure vessel are closed. In certain embodiments, a pump (not shown in FIG. 1) is then used to evacuate pressure vessel 20 to reduce the amount of air that would otherwise contaminate the crude Xe that will be released from the light bulb capsules. The pump can be either a vacuum pump or a semi-hermetic scroll pump that provides high compression ratios with limited contamination due to pump seal leakage. In these or other embodiments, pump is in electrical communication with the process controller. Once the chamber of the pressure vessel 20 is evacuated, a crusher 32 operated by a motor shown as 34 which cracks the defective bulbs and releases the crude Xe which further comprises other gas(es) such as $N_2$ and trace amounts of phosphine, methyl bromide, and silane, contained therein.

In the embodiment shown in FIG. 1, the crusher is located inside pressure vessel 20 and can be, for example, a "jaw" type crusher 32 such as, without limitation, a JC-15 Jaw crusher. The specific size and/or type of the crusher and pressure vessel can vary based upon the size of the bulbs to be crushed, the anticipated loading for the crusher, and the desired throughput. In the embodiment shown in FIG. 1, the motor 34 is in electrical communication with process controller 50. The apparatus in FIG. 1 may optionally have a bulk dust collection system that uses a cyclone knockout pot to remove glass particles from the gas inside the pressure vessel (not shown).

Figure 2:
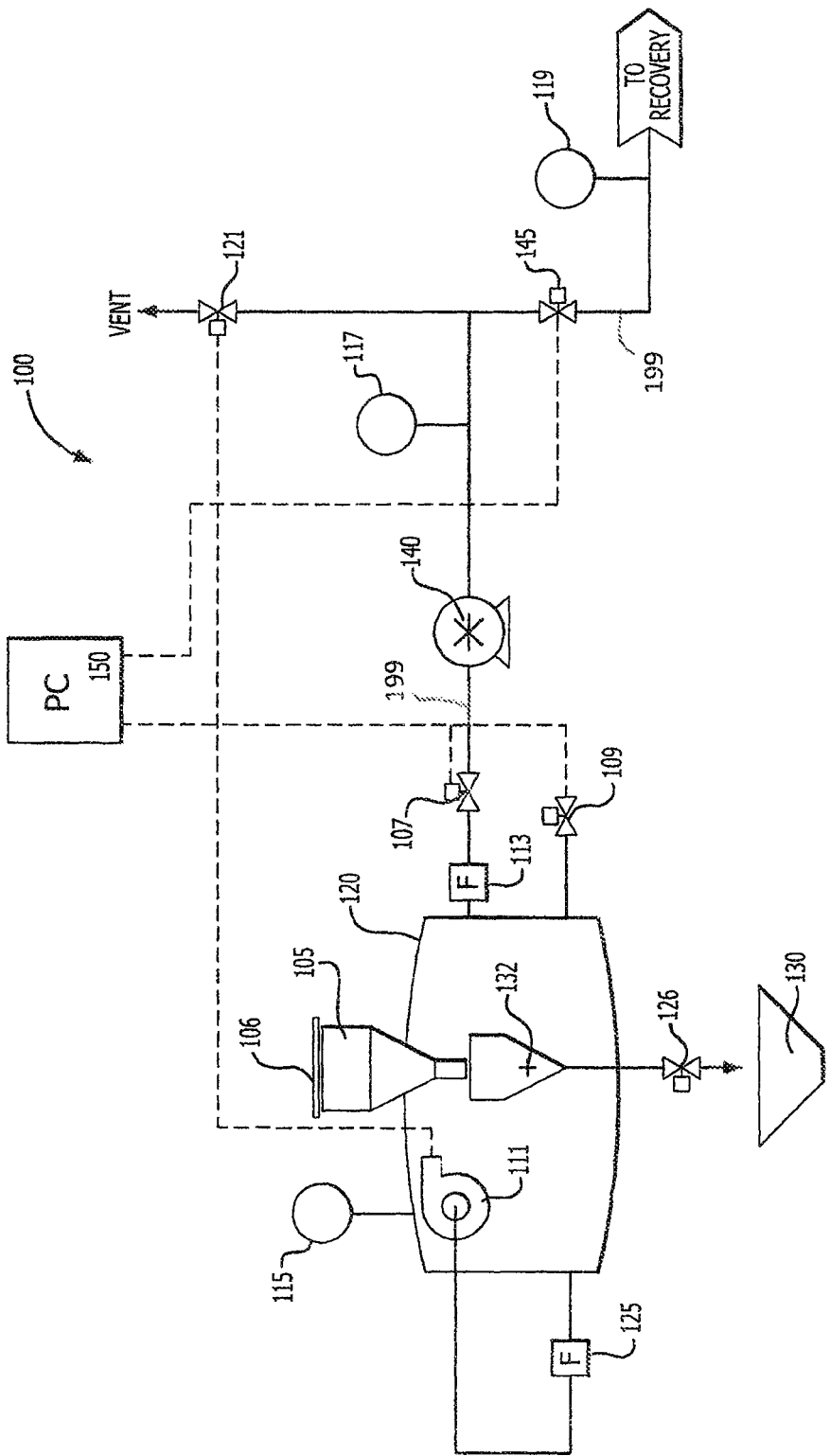
FIG. 2 provides an example of the system that is used to recover Xe from a glass light bulb.
Figure 3:
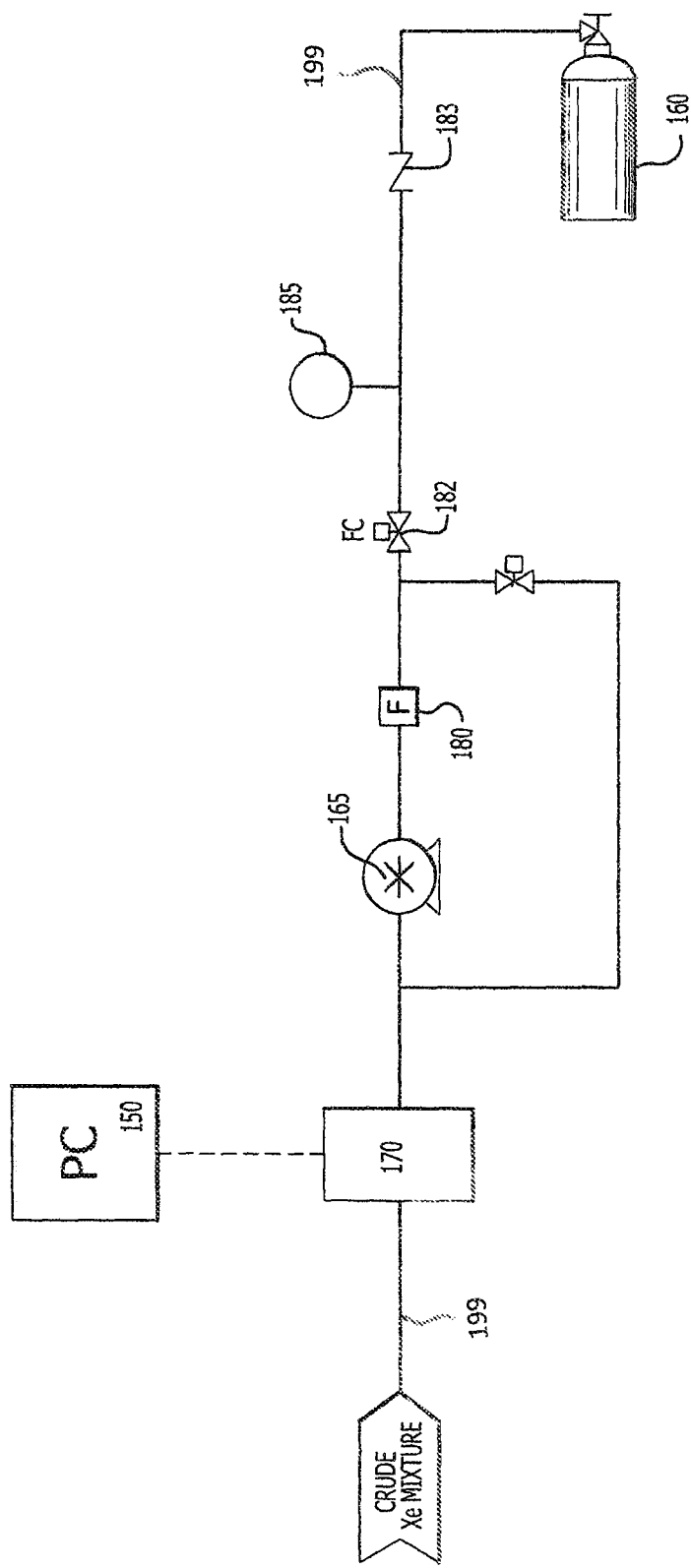
FIG. 3 provides an example of the system of FIG. 2 that is used to capture the Xe released from the bulbs and transfer to a storage vessel.

FIGS. 2 and 3 provide an example of an embodiment of the system described herein. In the embodiment shown in FIG. 2, the capacity is about 12,500 bulbs. In this embodiment, crushing 12,500 bulbs generates 125,000 cc or 4.4 cu. ft. of Xe gas. Referring now to the system 100 in FIG. 2, the blower 111 for the bulk dust collection for system 100 is located inside of the pressure vessel 120 to eliminate possible inboard leaks that occur if the housing of the blower was exposed to outside air. As previously mentioned, a load of defective bulbs or feed stock having the Xe gas contained therein is loaded into the feed hopper 105 and filled to a certain capacity and lid 106 is bolted thereon. Pressure vessel 120 further comprises a pressure transducer 115. A valve 107 is opened and vacuum pump 140 pulls vacuum on the system to remove any residual air. In the system shown in FIG. 2, vacuum line further comprises a filter 113 in fluid communication with the pressure vessel 120. After the air has been removed, the bulb crusher 132 is activated and crushes the bulbs contained therein. After the defective bulbs are crushed within crusher 132, the atmosphere inside the pressure vessel 120 should be a crude Xe gas mixture comprised mainly of Xe with a balance of Nitrogen and other trace gases. The crude Xe gas mixture is then removed from the pressure vessel 120 by means of the vacuum pump 140 where it is eventually sent via recovery line 199 to a recovery vessel (as shown in FIG. 3 as 160). A dust collection system which uses pump 111 and having filter 125 is turned off during vacuum evacuation of pressure vessel 120. After the bulbs have been crushed, the dust collection system turns on to collect any residual dust generated during the crushing process. When the dust has been collected, the bulk dust collection system is shut off. After the load of bulbs in pressure vessel 120 has been crushed and the recovered gas comprising Xe is sent to recovery vessel 160, valve 126 opens allowing the glass and metal residues of the crushed bulbs within pressure vessel 120 to be released into collection hopper 130 and the pressure vessel 120 is allowed to reach atmospheric pressure. The collected glass from the crushed light bulbs can then be recycled, for example, as cullet for a glass melt. After all of the crude Xe mixture is recovered from pressure vessel 120, crusher 132 is turned off and the internal chamber of the pressure vessel 120 is vented back to atmospheric pressure by opening valve 109. Additional pressure transducers 117 and 119 are shown in system 100 to monitor the pressure in the fluid lines. An additional valve is provided at 121 for further venting of the line. The system shown in FIG. 2 further comprises a process controller 150 which is in electrical communication with at least one of the following components within the system, such as without limitation, vacuum pump 140, valve 107, dust collection pump 111, valve 145, vent valve 121, and vent valve 145. Process controller 150 can also be in electrical communication with one or more of the pressure transducers 115, 117, and 119 to monitor the pressure in the fluid lines. Like in apparatus 10, process control 150 can be a central processing unit, wireless signal receiver or other means that can direct, receive, or both electrical signals from one or more components within system 100 to activate or deactivate one or more components within system 100.

Referring now to FIG. 3, recovery vessel 160 which is shown as a storage cylinder can be located outside of the main framework for replacement with an empty cylinder (not shown). The full storage cylinder containing the crude Xe mixture can then be sent offsite for purification. Once purified, the Xe can be sold as a commodity gas for use in glass light bulb manufacturing or other manufacturing processes.

Referring again to both FIGS. 2 and 3, vacuum pump 140 is reactivated, vacuum valve 145 opens, and the recovered crude Xe mixture goes to storage in a recovery vessel or storage cylinder 160 shown in FIG. 3 or other means. When vacuum pump 140 returns the pressure vessel 120 to vacuum, crusher 132 turns off, and pressure vessel valve 145 closes, and vacuum pump 140 shuts off, and compressor pump 165 runs until the outlet pressure stabilizes. With recovery valve 145 closed, vent valve 109 opens thereby equalizing pressure in the chamber of the pressure vessel. Gate valve 126 opens thereby emptying the crushed bulbs or glass residue into the collection hopper 130 (shown as 30 in FIG. 1). The vent valve 109 closes, the gate valve 126 closes, and the pump 111 associated with the bulk dust collection system then turns off. The system shown in FIGS. 2 and 3 is then ready to receive its next feed stock of defective bulbs. In FIG. 3, the crude Xe mixture from the feed lot of defective bulbs is passed through a Xenon sensor 170. In the embodiment shown in FIG. 3, Xenon sensor 170 is in electrical communication with process controller 150. Compressor pump 165 then feeds the crude Xe mixture through particle filter 180 through a series of valves, such as valve 182, and check valve 183 into recovery vessel or storage cylinder 160. Pressure gauge 185 measures the volume of crude Xe mixture within recovery vessel 160.

Figure 4:
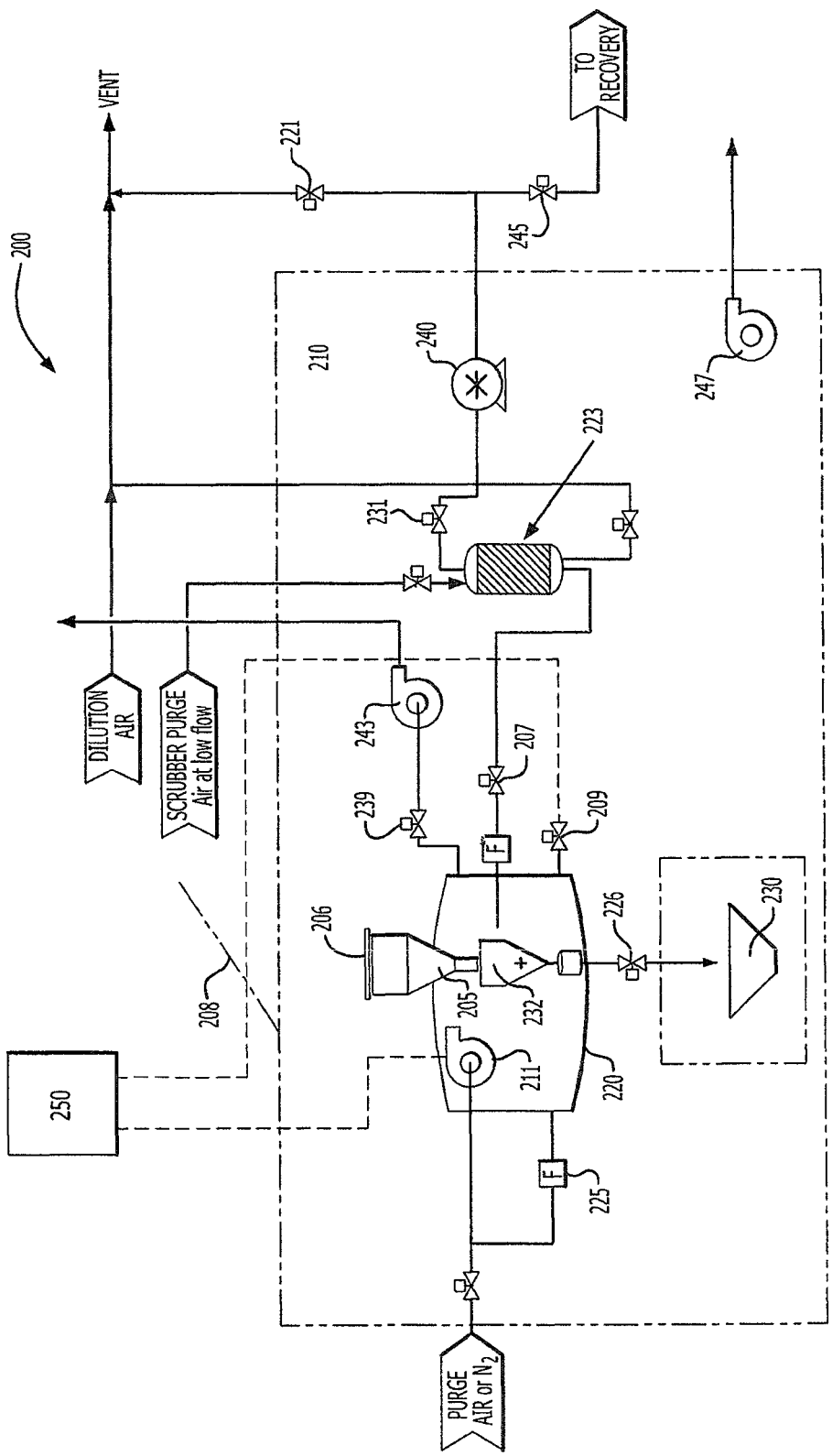
FIG. 4 provides an example of the system that is used to recover Xe from a glass light bulb and remove toxic impurities using a catalyst material from the crude Xe mixture and the captured Xe is sent to a storage vessel shown in FIG. 5.
Figure 5:
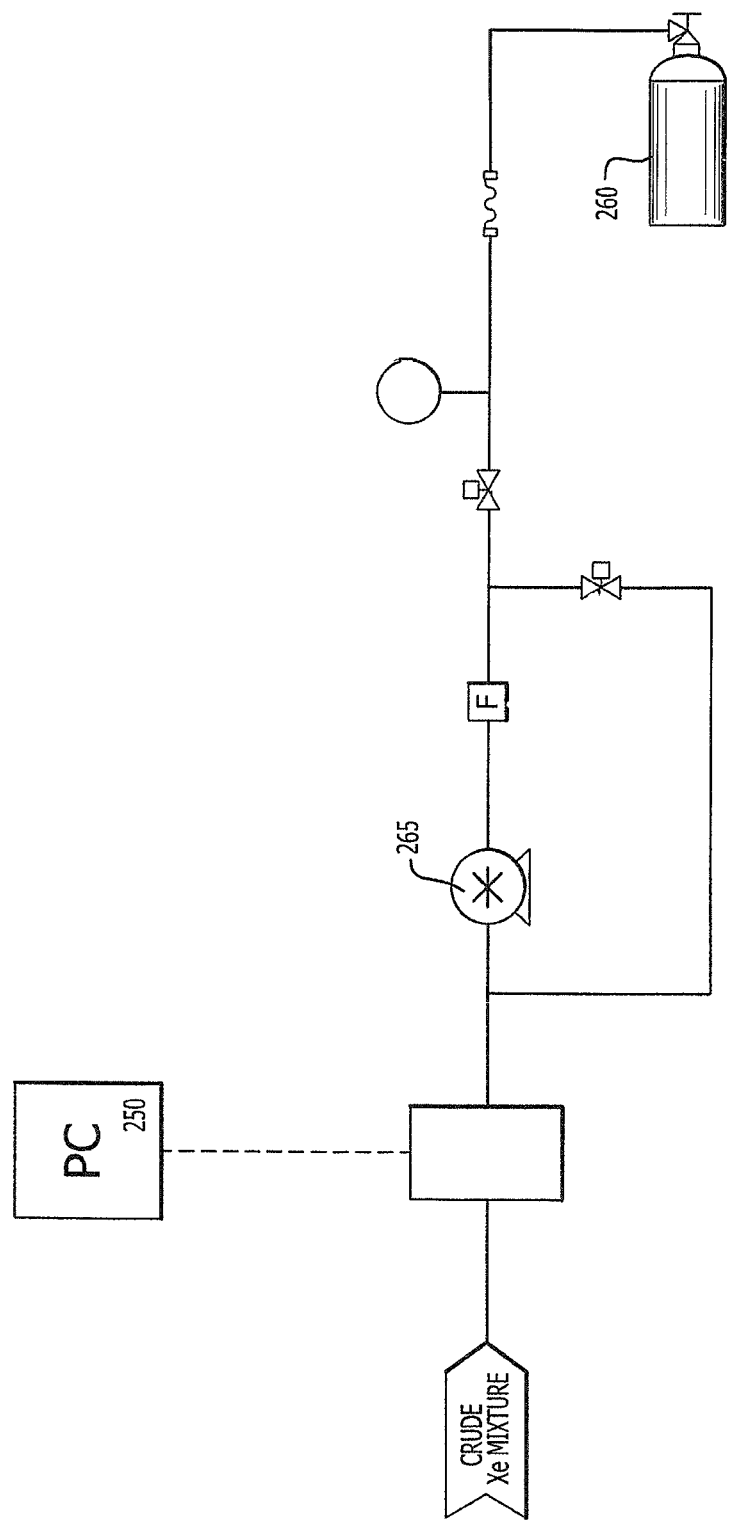
FIG. 5 provides an example of the system of FIG. 4 wherein the crude Xe is purified via a scrubber and a non-toxic, purified xenon and nitrogen mixture is sent to storage. The non-toxic, purified xenon and nitrogen mixture can be re-used in the glass light bulb manufacturing process or for another manufacturing process after additional purification.
Figure 6:
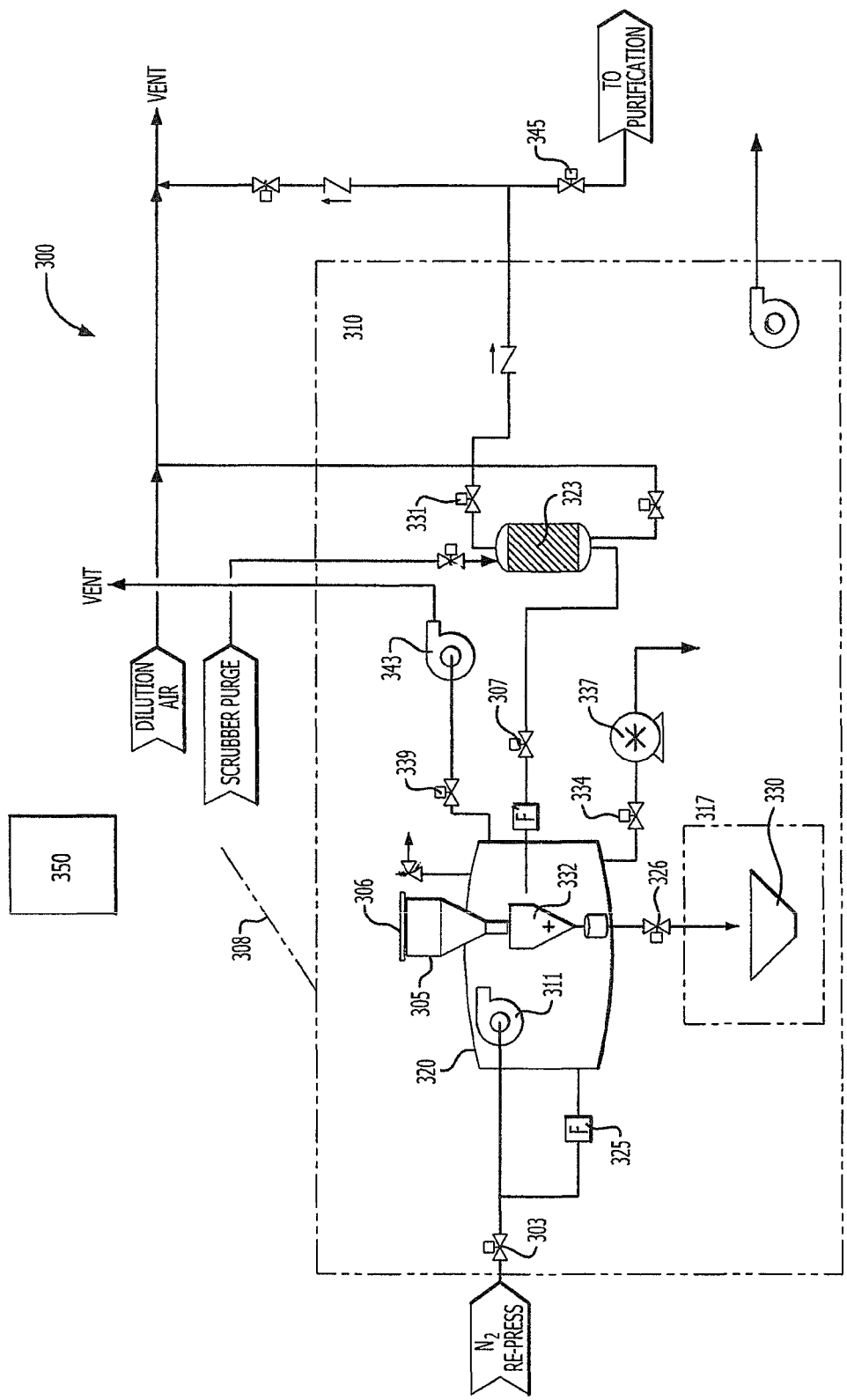
FIG. 6 provides an example of the system that is used to recover Xe from a glass light bulb and remove initial impurities using a catalyst material from the crude Xenon and the Xenon is sent to a recovery vessel.
Figure 7:
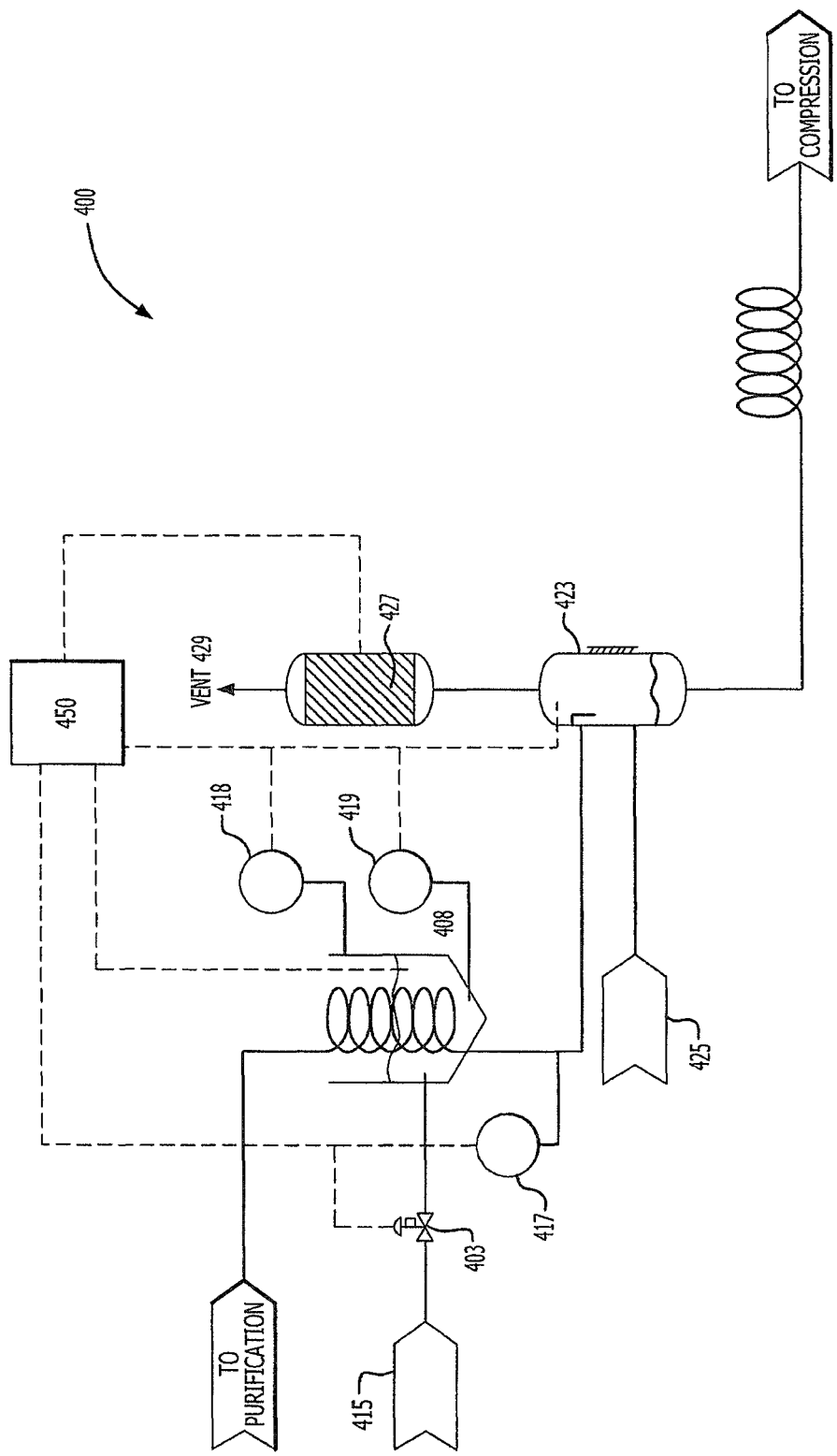
FIG. 7 provides an example of how the crude Xe mixture extracted in the system shown in any one of the systems shown in FIG. 2, 4, or 6 is purified to remove the initial and/or toxic impurities, remove nitrogen, and provide a non-toxic, highly concentrated Xe (e.g., greater than 90% purity Xe) prior to being sent to recovery vessel and/or re-use.
Figure 8:
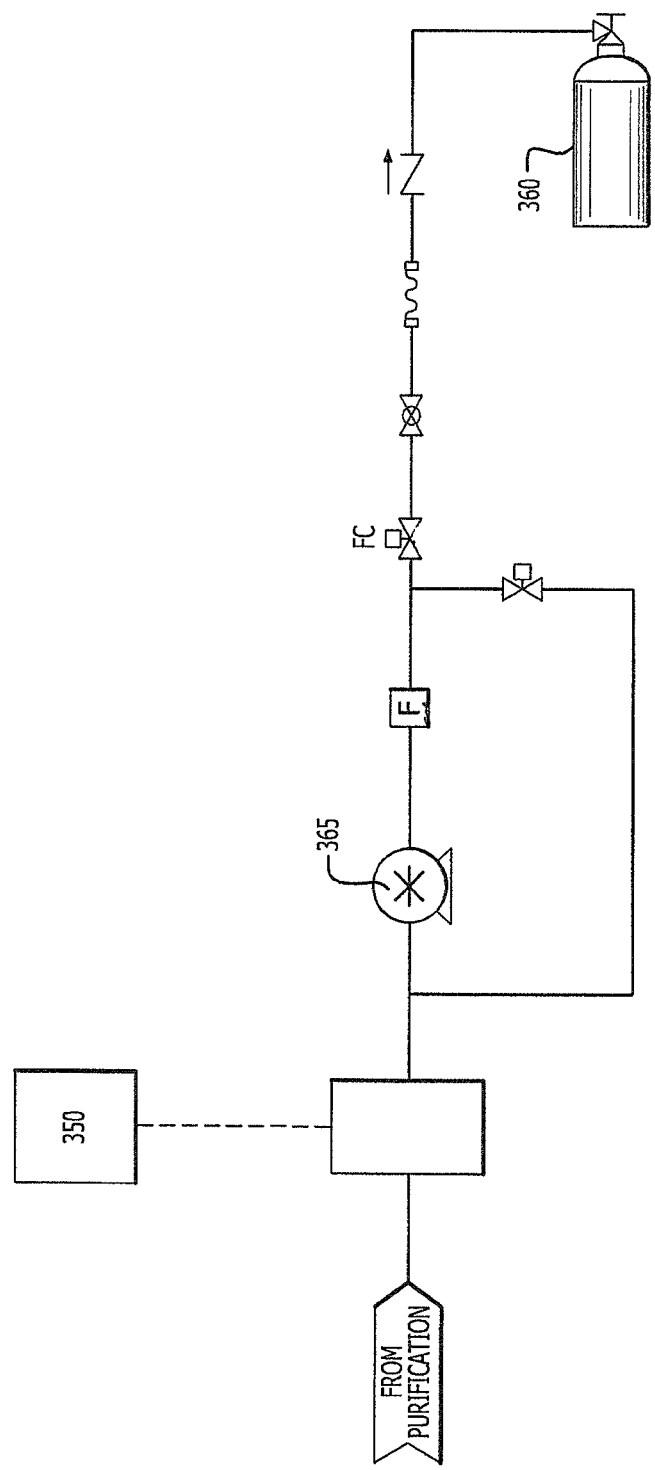
FIG. 8 provides an example of the system of FIGS. 6 and 7 wherein the purified Xe is compressed and then transferred to a recovery vessel where it can be re-used on-site in the glass light bulb manufacturing process or, alternatively, for another manufacturing process.

FIGS. 4 through 8 provides embodiments of systems for capturing and recovering then crude Xe mixture from the defective light bulb capsules and then purifying the crude Xe mixture by removing any impurities contained therein to yield a purified crude Xe mixture. The system provided in FIGS. 6 through 8 further removes the nitrogen from the crude or purified Xe gas mixture to be reused on-site or alternatively using in another manufacturing process. Unlike the system shown in FIGS. 2 and 3, the system 200 in FIGS. 4 and 5 has a ventilated enclosure 210 to allow removal of any toxic impurities from the crude Xe gas mixture. In these systems, 225 is an absorber or adsorber-vessel designed to remove toxic impurities in the Xe-containing gas stream such as, without limitation, $SiH_4$, $PH_3$, and $CH_3Br$; 243 is an exhaust blower to prevent personnel exposure during bulb loading in the event of breakage; 247 is an exhaust blower to ventilate the equipment enclosure and ensure a buildup of toxic gas does not accumulate inside the enclosure. FIG. 7 provides an embodiment wherein the crude Xe mixture generated from the apparatus depicted in FIG. 1 or any one or more of the systems shown in FIGS. 2, 4, and 6 is purified. The purified Xe can be sent to a storage vessel such as that shown in FIG. 3 or re-used. FIG. 8 shows a system wherein the purified Xe is compressed and then transferred to a recovery vessel or storage vessel 360 to be used.

Referring to FIG. 4, the system 200 operates by opening ventilated enclosure fill hatch 208, and 239 opens automatically and turns on pump 243. The lid 206 on the pressure vessel 220 is removed to receive a load of light bulb capsules from the feed hopper 205 and the lid 206 of the pressure vessel 220 is secured. The ventilated enclosure 210 is sealed to prevent personnel access and valve 239 closes and pump 243 turns off. After valve 207 and 231 opens, pump 240 pulls vacuum on the system to remove any residual air within the pressure vessel 220 and air vents through valve 221. Pump 240 turns off and 207 Closes. The bulb crusher 232 turns on and crushes bulbs generating thereby releasing a crude Xe gas mixture. After the bulbs have been crushed to provide a glass residue, the bulk dust collection system turns on via pump 211, 240 turns on, valve 245 opens, pump 265 turns on, and the crude Xe gas mixture is sent to storage in the recovery vessel or storage cylinder 260 (see FIG. 5). When the pump 240 returns the pressure vessel 220 to vacuum, pump 240 turns off, valves 207 and 231 close, and pump 265 runs until outlet pressure stabilizes. The valve 245 closes, valve 209 opens thereby equalizing pressure in the chamber of the pressure vessel, valve 239 opens, and pump 243 turns on. The bottom valve or 226 opens in the pressure vessel 220 thereby emptying the crushed bulbs or glass residue into the collection hopper 230. The 226 remains open for a certain period of time to dilute the atmosphere within the pressure vessel 226. Afterwards, valve 209 closes and valve 226 closes. Pump 211 turns off, valve 239 closes, and P-243 Turns off. The system is then ready to receive its next feed of glass bulbs.

As previously mentioned, the system 300 shown in FIGS. 6 and 7 and/or the system shown in FIG. 8 removes the impurities within the crude Xe mixture like the system 200 shown in FIGS. 4 and 5 but further purifies the crude Xe mixture by removing the nitrogen contained therein. Referring again to FIG. 6, the system 300 operates by opening ventilated enclosure fill hatch 308, and 339 opens automatically and turns on 343. The lid 306 on the pressure vessel 320 is removed to receive a load of light bulb capsules from the feed hopper 305 and the lid 306 of the pressure vessel 320 is secured. The ventilated enclosure 310 is sealed to prevent personnel access and valve 339 closes and pump 343 turns off. After valves 307 & 334 opens, pump 337 pulls vacuum on system to remove any residual air within the pressure vessel 320. Pump 337 turns off and valve 334 closes. The bulb crusher 332 turns on and crushes bulbs generating thereby releasing a crude Xe gas mixture. Referring to both FIGS. 6 and 8, after the bulbs have been crushed to provide a glass residue, the bulk dust collection turns on via pump 311, valve 345 opens, 365 turns on, and the crude Xe gas mixture is sent to storage in the recovery vessel or storage cylinder 360. When the pump 365 returns the pressure vessel 320 to vacuum, crusher 332 turns off, valves 307 & 331 close, and pump 365 (see FIG. 8) runs until outlet pressure stabilizes. The valve 345 closes, valve 303 opens thereby equalizing pressure in the chamber of the pressure vessel 320, 339 opens, and pump 343 turns on. The bottom valve or 326 opens in the pressure valve thereby emptying the crushed bulbs or glass residue into the collection bin 330. The 326 remains open for a certain period of time to dilute the atmosphere within the pressure vessel. Afterwards, valve 303 closes and valve 326 closes. Pump 311 turns off, valve 339 closes, and 343 Turns off. The system 300 is then ready to receive its next feed of glass bulbs. The system 300 in FIG. 6 shows a 325 purifier for removal of methyl bromide from the crude Xe mixture.

In certain embodiments such as that shown in FIG. 7, heat exchanger 408 is in fluid communication with liquid nitrogen and/or other refrigerant(s) sources 415 to condense the crude Xe gas mixture from the systems depicted in FIG. 2, 4, or 6 to a liquid and is monitored by low level sensor 419 and high level sensor 418; phase separator 423 allows pure liquid Xenon to go on to compression and storage and is in fluid communication with nitrogen purge source 425; and an exhaust scrubber 427 to collect any remaining toxic gasses such as, without limitation, $SiH_4$ and/or $PH_3$, before it goes onward to vent 429.

FIG. 7 further shows a silane and phosphine purifier or 427, a condenser 408 which condenses the crude Xe mixture to a liquid, and a separator 423 to remove the nitrogen contained within the crude Xe mixture to provide a purified Xe which can be reused on-site for the manufacture of new glass light bulb capsules, or alternatively used for other manufacturing processes. In the purification system 400 shown in FIG. 7, process controller 450 is in electrical communication with one or more of the components such as the condenser 408, the separator 423, the purifier 427, the sensors 417-419, and valve 403.

All of the systems described herein can further comprise one or more processing unit 50, 150, 250, 350, and 450 process controller(s), central processing unit, etc. which is in electrical communication with any one or more of the elements of the system such as, without limitation, the pressure vessel, valves, vacuum pumps, bulk dust collection, crusher, and/or crude Xe or purified recovery or storage vessel.

In some of the embodiments shown herein, some or all of the fluid lines shown in the apparatus, system or method are comprised of stainless steel such as, without limitation, ⅛" or ¼" tubing. However, other materials of construction can also be used herein.

The invention claimed is:

1. An apparatus for capture and recovery of a process gas comprising xenon from articles of manufacture, the apparatus comprising:
   (a) a feed hopper to receive feed comprising articles of manufacture having the process gas contained therein and having a conduit to a pressure vessel, wherein the process gas comprises xenon;
   (b) the pressure vessel having a lid with an opening to receive the feed, a bottom which is in communication with a collection vessel, and a crusher contained therein wherein the pressure vessel is in fluid communication with a vacuum line, a valve in said vacuum line and a vacuum pump or a semi-hermetic scroll pump that evacuates the pressure vessel by removing air from said pressure vessel when all access points to said pressure vessel are closed and wherein the crusher crushes the articles of manufacture in the evacuated pressure vessel to provide a crude gas comprising xenon and glass residue;
   (c) the collection vessel to receive the glass residue from the pressure vessel;
   (d) a dust collection system in fluid communication with the pressure vessel to remove any residual dust that arises from the glass residue;
   (e) a recovery line having a connection to the pressure vessel for removing the crude gas comprising xenon from the pressure vessel and sending it to a recovery vessel;
   (f) a process controller;
   (g) an automatic valve in the recovery line having a signal connection to the process controller; and
   (h) the recovery vessel in electrical communication with the process controller wherein the recovery vessel comprises the crude gas comprising xenon.

2. The apparatus of claim 1 wherein the pressure vessel is housed in an enclosure which is ventilated.

3. The apparatus of claim 1 wherein the recovery vessel comprises a storage cylinder.

4. The apparatus of claim 1 further comprising a purifier wherein the crude gas comprising xenon is purified prior to being sent to the recovery vessel.

5. A system for the capture and recovery of a xenon gas mixture from an article of manufacture having xenon contained therein, comprising:
   a process controller;
   a pressure vessel comprising: an input for receiving articles of manufacture having xenon contained therein, a crusher which takes the articles of manufacture and forms a glass residue and xenon gas mixture, one or more lines in fluid communication with said pressure vessel; said one line in fluid communication with a valve and a pump, and electrical communication with said process controller;

wherein said pump pulls vacuum to remove residual air from said pressure vessel prior to the formation of said glass residue and said xenon gas mixture to reduce contamination of said xenon gas mixture with said residual air; and a recovery line from the pressure vessel for removing said xenon gas mixture from the pressure vessel and sending it to a recovery vessel.

6. The system of claim 5 further comprising a purifier for removing impurities from the xenon gas mixture.

7. The system of claim 6 further comprising a separator for removing nitrogen from the xenon gas mixture.

8. The system of claim 7 further comprising a dust collection system.

9. The system of claim 5 further comprising a separator for removing nitrogen from the xenon gas mixture.

10. The system of claim 9 further comprising a condenser.

11. The system of claim 5 further comprising a dust collection system.

12. The system of claim 5 wherein said xenon gas mixture comprises xenon, nitrogen and other trace gases.

13. The system of claim 5 wherein said pump is a vacuum pump or a semi-hermetic scroll pump.

* * * * *